UNITED STATES PATENT OFFICE.

FRIEDRICH RÖMPLER, OF VIENNA, AUSTRIA-HUNGARY, ASSIGNOR TO PROTALBIN-WERKE ACTIENGESELLSCHAFT, OF DRESDEN, GERMANY.

PROCESS OF PRODUCING PHOTOGRAPHIC EMULSIONS.

No. 797,458.          Specification of Letters Patent.          Patented Aug. 15, 1905.

Application filed January 22, 1904. Serial No. 190,161.

*To all whom it may concern:*

Be it known that I, FRIEDRICH RÖMPLER, chemist, a subject of the Emperor of Germany, residing at 20 Ottakringerstrasse, in the city of Vienna, Austria-Hungary, have invented a certain new and useful Process of Producing Photographic Emulsions, of which the following is a specification.

The heretofore-known methods of employing casein as a carrier of substances for photographic paper consisted in dissolving casein in a dilute solution of ammonia or citric acid and in adding halogen salts, then coating suitable paper with this compound, and after drying to make it sensitive just in the same manner as albumen-paper is treated, floating it upon a solution of nitrate of silver. This process naturally is not suitable for a manufacture on a large scale, and the product is naturally a paper of inferior stability and could be made easily by the photographers in their own studios.

The object of the present invention is a process for producing a casein compound capable of forming a photographic casein emulsion, and with this end in view the ordinary casein is digested with a strong alkali, then precipitated by neutral salts.

The casein is either immediately drawn off or it is maintained in contact with the precipitating agent for some time—say from one-half to three hours—whereupon it is separated and kept for several days suspended in water of moderate temperature. The product thus obtained does not show any precipitates in acid, alkaline, or alcoholic solution with halogen and silver salts added in correct proportions, but it gives a faultless halogenic silver emulsion which can be employed for the production of a perfect and excellent photographic-printing paper in the same manner as gelatin or collodion emulsions.

To practically execute this new process, the following may be stated as an example.

Fifty kilograms ordinary casein are stirred together with five hundred liters of soda-lye at a temperature of 15° Celsius until the mass is intimately mixed. A complete dissolving is avoided, the mixture filtered, and to the clear filtrate is added a highly-concentrate solution of sulfate of magnesia in water, to which, preferably, a small percentage of sulfuric acid has been added. The precipitation thus received is thereafter kept in contact with the precipitating means during several hours and at a temperature of about 12° Celsius. Thereupon the clear liquid is removed and the precipitate is washed with water until a sample of the wash-water is only slightly clouded with a solution of barium nitrate. The precipitate is then allowed to stand under water for three or four days in a covered vessel standing in a cool room until a sample taken therefrom dissolves completely and clearly in dilute alcoholic citric acid. The product resulting therefrom is freed from water in a centrifugal apparatus and dried upon stone plates. After such desiccation the product is a transparent mass, hard as glass and easily soluble in alkaline as well as in acid, alcoholic, and aqueous solvents, giving when treated with halogen and silver salts not only no precipitate, but a faultless emulsion.

As an example for such an emulsion the following may be stated: One hundred grams of the modified casein are dissolved in one liter of alcoholic, acid, alkaline, or aqueous solvent, according to the paper to be produced. Under application of heat to this solution is added a sufficient quantity of a suitable chlorid, giving about seven grams of chlorid per liter. Hereupon the quantity of nitrate of silver determined from the chlorid and the acid is added under application of heat in a solution as dilute as possible, and the forming emulsion is subjected to a process of maturing for several hours. It is advantageous to add castor-oil, soap, or glycerin for the purpose of increasing the elasticity of the emulsion. The emulsion thus obtained is spread in the usual mechanical way upon paper and can be colored by the addition of anilin colors in any desired way.

Having thus described my invention, what I claim, and desire to secure by Letters Patent, is—

1. The herein-described process for producing a photographic casein emulsion, which consists in partly dissolving the casein in strong alkali and partly converting it in the casein-alkali compound, then precipitating by sulfate of magnesium, maintaining the casein in contact with the precipitating agent, removing the clear liquid, washing the precipitate with water, dissolving the casein and treating with halogen and silver salts.

2. The herein-described process of forming a photographic casein emulsion, which consists in producing a modified casein compound, capable of forming a photographic casein emulsion, dissolving the same in a solvent, adding chlorid under heat, then adding under application of heat a dilute solution of nitrate of silver.

3. The herein-described process of forming a photographic casein emulsion, which consists in producing a modified casein compound, capable of forming a photographic casein emulsion, dissolving the same in a solvent, adding chlorid under heat, then adding under application of heat a dilute solution of nitrate of silver, then adding a saponaceous substance to increase the elasticity of the emulsion.

In testimony whereof I affix my signature.

FRIEDRICH RÖMPLER.

In presence of—
   FRIEDRICH BINDER,
   ALVESTO S. HOGUE.